United States Patent [19]

Rhodes

[11] Patent Number: 5,119,584
[45] Date of Patent: * Jun. 9, 1992

[54] AQUATIC ANIMAL TRAP

[76] Inventor: Robert J. Rhodes, 23687 Hoo Shoo Too Rd., Baton Rouge, La. 70817

[*] Notice: The portion of the term of this patent subsequent to Dec. 31, 2008 has been disclaimed.

[21] Appl. No.: 735,078

[22] Filed: Jul. 24, 1991

Related U.S. Application Data

[63] Continuation of Ser. No. 593,237, Oct. 5, 1990, Pat. No. 5,076,007, which is a continuation-in-part of Ser. No. 334,867, Mar. 3, 1989, abandoned.

[51] Int. Cl.⁵ .................................................. A01K 69/00
[52] U.S. Cl. .......................................... 43/100; 43/65; 43/102
[58] Field of Search ................. 43/100, 102, 103, 104, 43/105, 65

[56] References Cited

U.S. PATENT DOCUMENTS

| | | | |
|---|---|---|---|
| 3,740,892 | 6/1973 | Cox et al. | 43/100 |
| 3,772,818 | 11/1973 | Gardina | 43/100 |
| 3,795,073 | 3/1974 | Olsen | 43/105 |
| 3,906,654 | 9/1975 | Leslie | 43/65 |
| 3,916,558 | 11/1975 | Crouch | 43/65 |
| 4,075,779 | 2/1978 | Olafson | 43/100 |
| 4,554,759 | 11/1985 | Edling et al. | 43/100 |
| 4,819,369 | 1/1989 | Bodker | 43/102 |

Primary Examiner—Kurt Rowan
Assistant Examiner—Chuck Y. Mah
Attorney, Agent, or Firm—Robert C. Tucker; William David Kiesel; C. Dean Domingue

[57] ABSTRACT

An aquatic animal trap is provided, comprising a center enclosed cell having a bottom and mesh sides having at least one entrance passageway formed therein; and at least three radially spaced outer enclosed cells, each of the outer cells having a bottom and mesh sides having at least one entrance passageway formed therein and connected to the center cell via a radial passageway.

2 Claims, 2 Drawing Sheets

AQUATIC ANIMAL TRAP

This is a continuation of co-pending application Ser. No. 593,237, filed on Oct. 5, 1990, now U.S. Pat. No. 5,076,007, which is a continuation-in-part of Ser. No. 334,867 filed on Mar. 3, 1989, now abandoned.

BACKGROUND OF THE INVENTION

1. Field of the Invention

This invention relates generally to devices for capturing aquatic animals and, more specifically, to aquatic animal traps designed to decrease overall time involved in harvesting aquatic animals while maintaining total harvest.

2. Prior Art

A lack of efficiency exists in the crayfish industry because it has been assumed that two to three funnel cone or pillow mesh type traps are the best means of harvesting crayfish. This assumption has resulted in an expanding industry dependent on increasing labor without increasing trap efficiency. Little serious research has been done on increasing trap size and the number of funnels per trap. Current traps are passive storage chambers of wire or plastic mesh, without internal support, and require much handling to extract crayfish. Over time, traps can become deformed through use, fall over, become lost and/or stolen. Also, a review of prior art shows that exterior shapes are simple, funnels are close together, and animal storage areas make up the majority of the trap space.

SUMMARY OF THE INVENTION

Therefore, it is an object of this invention to provide an aquatic animal trap which reduces fishing time by reducing the number of traps to be handled.

It is another object of this invention to provide an aquatic animal trap which will not fall over in high winds, waves, and wakes.

It is still another object of this invention to provide an aquatic animal trap which will provide interlocking cells and create funnels out of trap space producing a stronger and more efficient trap.

It is a further object of this invention to provide an aquatic animal trap which takes crayfish population dynamics into consideration the design of a larger trap than utilized in the prior art.

It is yet another object of this invention to provide an aquatic animal trap which accomplishes some or all of the above objects, has the ability to use any and all baits or feeds and is adaptable to mechanical harvesting.

Accordingly, an aquatic animal trap is provided, comprising a center enclosed cell having a bottom and mesh sides having at least one entrance passageway formed therein; and at least three radially spaced outer enclosed cells, each of the outer cells having a bottom and mesh sides having at least one entrance passageway formed therein and connected to the center cell via a radial passageway. The trap, having multiple cells is larger than conventional traps, and thus reduces the number of traps handled to trap the same quantity of animals. The trap is stable when in use due to its multicell construction, which also takes advantage of crayfish population dynamics to increase trap production.

DETAILED DESCRIPTION OF PREFERRED EMBODIMENTS OF THE INVENTION

Figure 1:
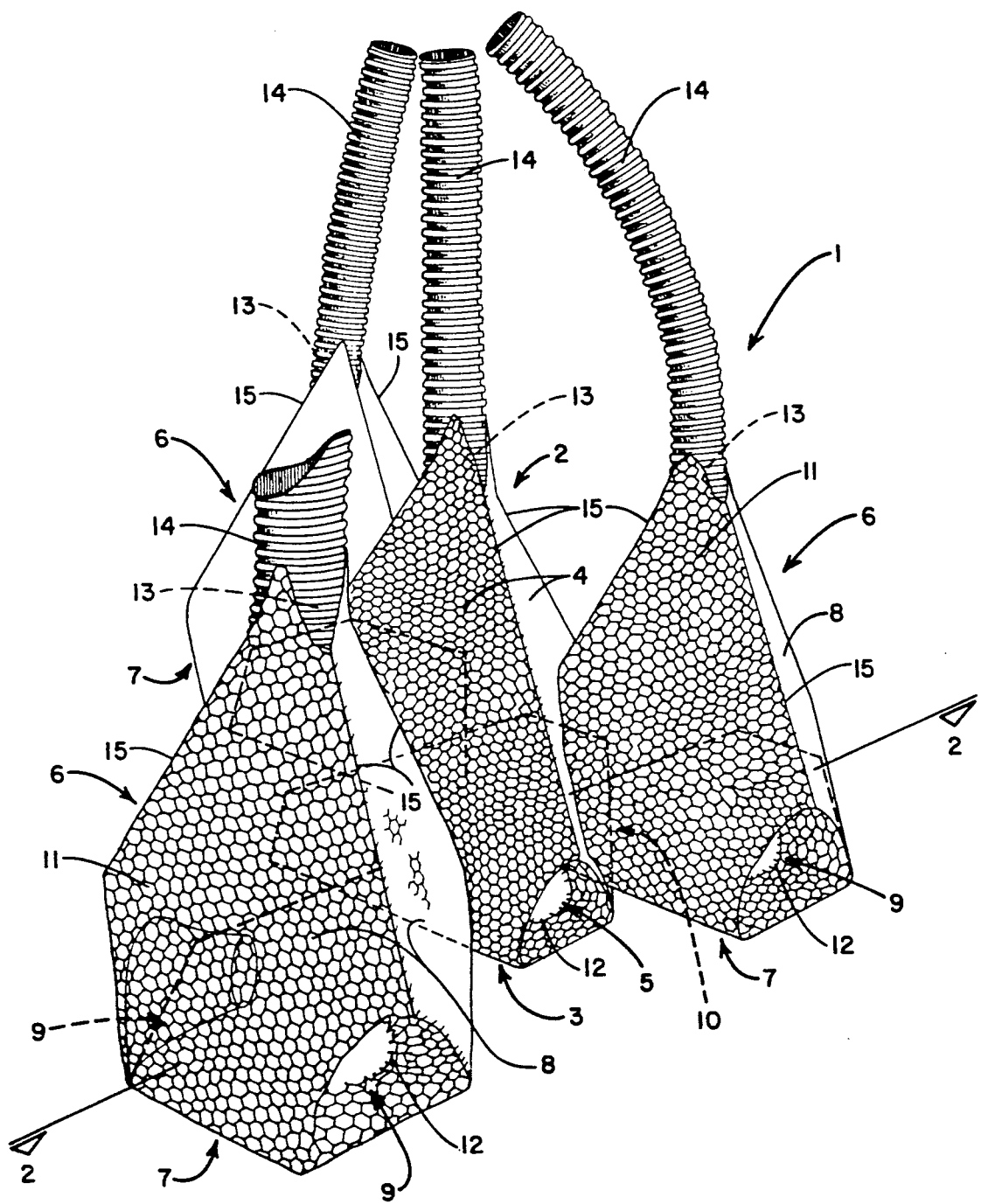
FIG. 1 is a perspective view of a preferred embodiment of the invention.
Figure 2:
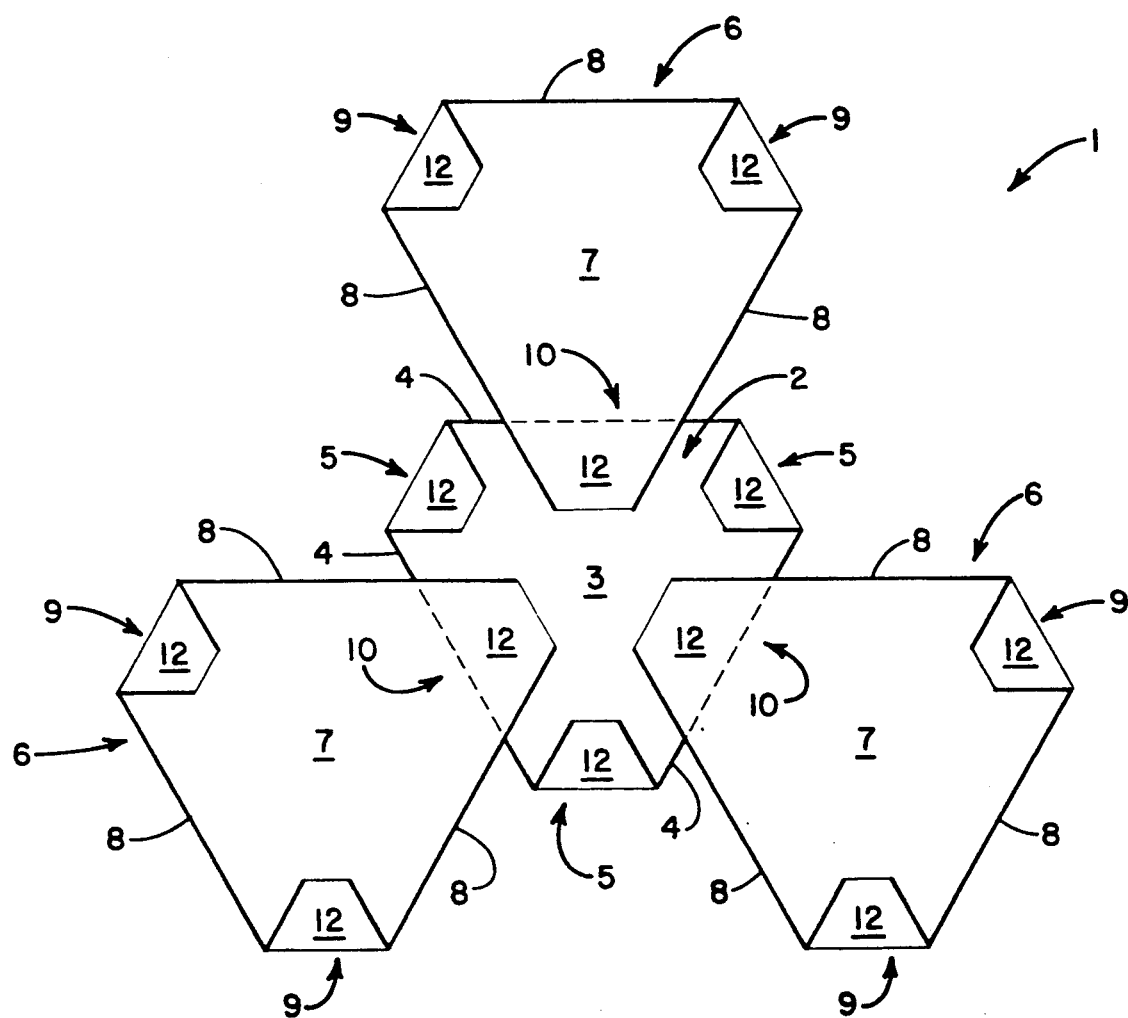
FIG. 2 is a sectional view of the invention taken along view line 2—2 of FIG. 1.

The primary function of the aquatic animal trap 1 is to increase the efficiency of harvesting crayfish. By reducing the number of traps 1 while proportionally increasing the number of animals caught per trap. The invention 1 is based on the theory that crayfish live and move in unique groups (clatters) and a practical trap design can be built to take advantage of this idea. Simply increasing trap size or number of trap entrances is inherently limited by trap and entrance durability and by crayfish population dynamics. Current industry trapping strategies and designs assume that over time, crayfish are uniformly dispersed on the bottom of the water body and that limited entrances with much storage area is sufficient for animal capture. A multicellular trap 1 increases stability and durability under all conditions and crayfish catchability is enhanced.

The Figures show a preferred embodiment of the aquatic trap 1. Generally, the invention 1 includes a center enclosed cell 2 having a bottom 3 and mesh sides 4. Center cell 2 is provided with at least one entrance passageway 5. Radiating outward from center cell 2 are at least three radially spaced outer cells 6, each having a bottom 7 and mesh sides 8. Each outer cell 6 likewise is provided with at least one entrance passageway 9. Each outer cell 6 is linked to center cell 2 via a radial passageway 10. Preferably, all entrance passageways 5,9 and radial passageways 10 are located just above bottoms 3,7. This is particularly preferable when the trap 1 is utilized to catch crayfish.

It is preferred that at least a portion of the sides 4,8 of cells 2,6 are constructed of mesh to allow for the free flow of water through the trap 1. In the preferred embodiment shown in the Figures, the entire trap 1 is constructed of wire mesh 11. Of course, other types of mesh may be utilized to wholly or partially construct trap 1. The use of wire mesh 11 allows for entrance passageways 5,9 and radial passageways 10 to be easily formed in the shape on inwardly protruding tubes 12 which allow animal movement toward center cell 2, but inhibit outward movement. It is preferable that tubes 12 are funnel-shaped, as shown, to further inhibit outward movement.

In the preferred embodiment there are three outer cells 6, spaced in a radially symmetrical manner around center cell 2. Center cell 2 has three entrance passageways 5, each located between two outer cells 6. Each outer cell 6 is provided with two entrance passageways 9. Ideally, bait is placed only in center cell 2. The trap is designed to funnel dominant crayfish population members toward entrance passageways 5, while entrance passageways 9 in outer cells 6 serve as entrance points for subordinate population members. Outer cells 6 act as holding areas as well as large internal funnels toward center cell 2. What is lost in a surface to volume ratio over four independent cells (standard crayfish traps) is made up for increased harvests, durability, and time saved.

Each cell 2,6 is actually a modified three-funnel wire mesh cone trap used by the crayfish industry. Each cell 2,6 has three sides 4,8 which are generally shaped as equilateral triangles. Entrance passageways 5,9 are located at the junctures 15 of sides 4,8 just above the bottoms 3,7. Radial passageways 10 are formed by simply extending corners of outer cells 6, with openings cut therein, through sides 4 of center cell 2. This construction is facilitated by the use of wire mesh 11 as trap material. Each cell 2,6 is provided with an apex opening 13, to which is attached an elongated conduit 14, which is used for baiting and removing the catch.

Use of the trap 1 is simple. It is baited (preferably only in center cell 2) and placed on the bottom of a body of water containing aquatic animals. After a desired period of time, the trap 1 is removed, trapped animals are emptied through conduits 14, the trap is re-baited and replaced.

The use of the invention 1 reduces the number of traps required to cover a given area of water bottom while increasing the catch. The trap 1 is stable in rough water or current conditions. Aquatic and terrestrial animals other than crayfish may be more efficiently harvested with this invention. Many variations are possible. Cells 2,6 could be of different shapes, sizes and numbers. Attachments could be added to accommodate water movement, and mesh could be of different materials and colors. Entrance numbers and sizes could be changed. Further means to guide the catch to the trap 1 could be added, such as guide wings. Since lighting influences crayfish habits a shade screen or lighting could be added. A frame could be installed to facilitate industry mechanization. These and other embodiments of the invention will occur to those skilled in the art and are intended to be included within the scope and spirit of the following claims.

I claim:

1. An aquatic animal trap, comprising:
   a. a center enclosed cell having a bottom and sides having at least one entrance passageway formed therein; and
   b. at least three radially spaced outer enclosed cells radiating outward from said center cell, each said outer cell having a bottom and sides having at least one entrance passageway formed therein and connected to said center cell via a radial passageway.

2. An aquatic animal trap according to claim 1, wherein at least a portion of said sides of said center cell and at least a portion of said sides of said outer cells are constructed of mesh.

* * * * *